United States Patent [19]

Stern

[11] Patent Number: 5,191,626
[45] Date of Patent: Mar. 2, 1993

[54] OPTICAL COMMUNICATIONS SYSTEM AND METHOD

[75] Inventor: Thomas E. Stern, New York, N.Y.

[73] Assignee: The Trustees of Columbia University in the City of New York, New York, N.Y.

[21] Appl. No.: 689,450

[22] Filed: Apr. 22, 1991

[51] Int. Cl.⁵ ............................................. G02B 6/28
[52] U.S. Cl. ...................................................... 385/24
[58] Field of Search ................ 350/96.16; 455/606, 455/607, 608, 609, 610; 385/24

[56] References Cited

U.S. PATENT DOCUMENTS

| | | | |
|---|---|---|---|
| 4,366,565 | 12/1982 | Herskowitz | 370/1 |
| 4,470,154 | 9/1984 | Yano | 455/607 |
| 4,592,043 | 5/1986 | Williams | 370/3 |
| 4,736,463 | 4/1988 | Chavez | 455/606 |
| 4,759,011 | 7/1988 | Hicks, Jr. | 370/3 |
| 4,845,702 | 7/1989 | Melindo | 370/1 |
| 4,906,064 | 3/1990 | Cheung | 350/96.15 |
| 4,914,648 | 4/1990 | Acampora et al. | 370/3 |
| 4,922,481 | 5/1990 | Hicks | 370/4 |

FOREIGN PATENT DOCUMENTS 0094866 11/1983 European Pat. Off. .

OTHER PUBLICATIONS

M. S. Chen et al., "A Media-Access Protocol for Packet-Switched Wavelength Division Multiaccess Metropolitan Area Networks", *IEEE Journal on Selected Areas in Communications*, vol. 8, No. 6, pp. 1048-1057 Aug. 1990.

*Primary Examiner*—John D. Lee
*Assistant Examiner*—Robert E. Wise
*Attorney, Agent, or Firm*—Brumbaugh, Graves, Donohue & Raymond

[57] ABSTRACT

Optical communications systems and methods are disclosed which involve routing optical signals through communications nodes which are controlled such that optical power arriving at input ports is linearly distributed to output ports. Such distribution may be realized by electro-optical, acousto-optical, or electro-mechanical controllable linear divider-combiner devices. Preferred systems including optical fiber links can be designed to make maximum use of physically realizable bandwidth, and to achieve high reliability in case of faults.

28 Claims, 4 Drawing Sheets

OPTICAL COMMUNICATIONS SYSTEM AND METHOD

BACKGROUND OF THE INVENTION

The present invention relates to communications systems and methods in which messages are transmitted in the form of wave-guided optical signals.

In switched telecommunications systems, wave-guided light is finding use as an information carrier, e.g., for digitally encoded voice, text, and graphics. Systems may be implemented as networks using optical fibers as communications links between communications nodes; alternatively, miniaturized systems or subsystems may utilize substrate-supported waveguides as in so-called integrated optics.

The design of lightwave networks depend critically on the availability of photonic components, e.g., light sources, detectors, couplers, switches, multiplexers, demultiplexers, wavelength filters, optical amplifiers, and other functional elements at network stations and nodes: as the development of such components progresses, new network designs or "architectures" become feasible. A representative selection of network-design disclosures is as follows:

European patent document EP-94-866, published Nov. 23, 1983 in the name of L. d'Auria et al., disclosing a bus architecture with active taps to communications terminals, e.g., a central processor unit, a printer;

U.S. Pat. No. 4,366,565, issued Dec. 28, 1982 to G. J. Herskowitz, disclosing a loop architecture for multiplexing based on the use of a plurality of angular modes in a multi-mode optical fiber;

U.S. Pat. No. 4,470,154, issued Sep. 4, 1984 to T. Yano, disclosing an optical communications network in which switching functions are carried out electrically;

U.S. Pat. No. 4,592,043, issued May 27, 1986 to G. F. Williams, disclosing a wavelength-multiplexed optical communications system in which fiber taps include a tunable resonant cavity for wavelength selection;

U.S. Pat. No. 4,736,463, issued Apr. 5, 1988 to J. D. Chavez, disclosing a fixed, multi-point optical network in a phased-array antenna;

U.S. Pat. No. 4,759,011, issued Jul. 19, 1988 to J. W. Hicks, Jr., disclosing frequency-selective coupling between optical communications loops;

U.S. Pat. No. 8,845,702, issued Jul. 4, 1989 to F. Melindo, disclosing a packet-switching network node with electrical-to-optical and optical-to-electrical signal conversion;

U.S. Pat. No. 4,914,648, issued Apr. 3, 1990 to A. Acampora et al., also disclosing a packet-switched lightwave system with electrical switching at the network nodes;

U.S. Pat. No. 4,922,481, issued May 1, 1990 to J. W. Hicks, disclosing a local-distribution optical communications system including frequency-tunable power taps.

Particularly significant as a motivating factor in network design is the desire to exploit the potentially very large bandwidth available in optical waveguide communications; in current, state-of-the-art systems, such potential is far from realized. Indeed, current systems are limited by an "electronic bottleneck" due to electronic switching functions carried out at network nodes, or by unnecessary power dissipation in (passive) star and bus broadcast designs.

The invention described in the following does not suffer from these drawbacks and offers a network architecture in which purely optical paths are established between selected network users on demand.

SUMMARY OF THE INVENTION

In an optical communications network, controllable optical interconnection means are included at network nodes. Preferred interconnection means provide for linear power division and recombination, from optical input ports to optical output ports. Preferably, an interconnection means further provides for separate power dividing and combining for different bands of optical wavelengths.

BRIEF DESCRIPTION OF THE DRAWING

FIG. i is a network diagram corresponding to a communications network of a preferred embodiment of the invention.

DETAILED DESCRIPTION OF PREFERRED EMBODIMENTS

Architecture and Operation

Typically, an optical communications system as preferred in accordance with the invention is designed for a multiplicity of communications channels which are grouped together into wavebands. For example, for optical-fiber communications at wavelengths near 1.55 micrometer, an assigned range of wavelengths from 1.5 to 1.6 micrometers may be subdivided into 16 wavebands 2 nanometers wide and centered at equally spaced wavelengths of 1.505, 1.511, 1.517, and so on through 1.595 micrometer. In this example, a waveband spacing of 6 nanometers is assumed for providing 4-nanometer "guard bands", e.g., for ease of filtering, multiplexing, and demultiplexing. Each of these wavebands encompasses a frequency range of approximately 250 gigahertz, so that, within each waveband, 24 communications channels can be assigned specified frequencies, with nominal channel frequencies spaced 10 gigahertz apart. (At a channel bit rate of $10^9$ bits per second, the combined resulting 384 channels provide each fiber with an information carrying capacity of approximately $0.4 \cdot 10^{12}$ bits per second. Depending on the capability and cost of the network components, the waveband and channel spacings might be reduced, thereby increasing the information carrying capacity of the fiber.) In this fashion, many optical communications sources can access the same fiber without interfering with each other, provided each one is assigned a unique channel in a unique waveband. This procedure is known as Frequency Division Multiple Access (FDMA). It is also possible to "channelize" the wavebands using other well-known techniques, e.g., time division multiple access (TDMA), subcarrier modulation, random access, polling, etc. A typical network may operate on anywhere from one to several hundreds of wavebands, and each waveband may contain anywhere from a single channel to several hundreds of channels.

Figure 1:
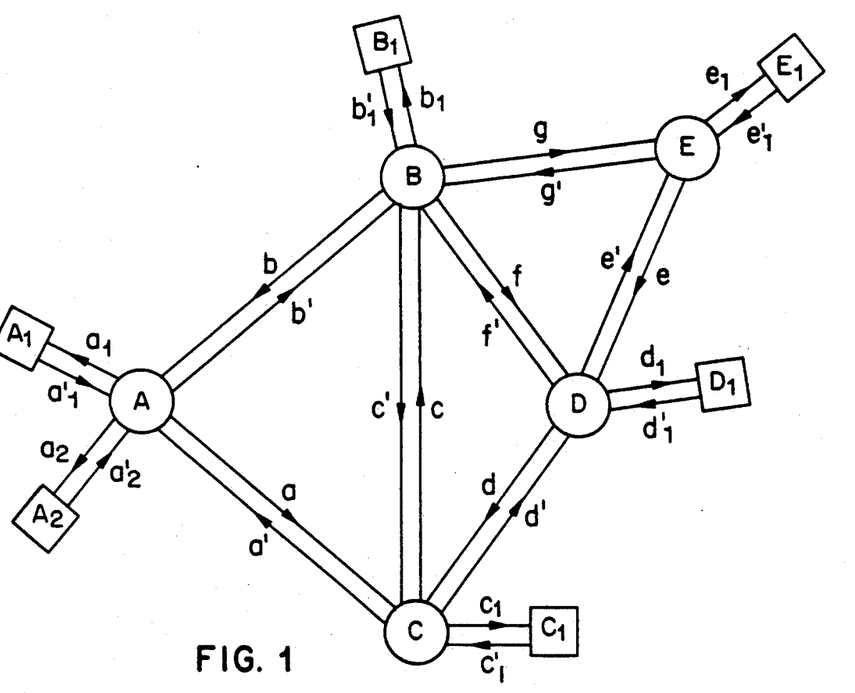

Schematically illustrative of an exemplary preferred embodiment of the invention, FIG. 1 shows a communications network comprising five communications nodes A through E, six communications stations $A_1$, $A_2$, and $B_1$ through $E_1$, and connecting optical communications links composed of pairs of optical fibers carrying optical signals in opposite directions. The communication links may incorporate optical amplification in the form of semiconductor or fiber amplifiers, either lumped or distributed, to compensate for attenuation on long fiber spans. The optical signals may be launched onto the fibers at moderate power levels to confine operation to the linear regime in the fibers, or at higher power levels to operate in a nonlinear regime so as to achieve a dispersionless soliton mode of propagation. Stations may belong to end users or to intermediaries, e.g., for interconnection with further communications facilities. The fibers are identified by pairs of unprimed and primed letters (e.g., a and a'.) Thus, nodes are denoted by capital letters (e.g., A), with stations attached to them denoted by corresponding subscripted letters (e.g., $A_1$, $A_2$). Station access links, which are also pairs of fibers in the example, carry the same subscripts as their stations (e.g., $a_1$, $a_2$.)

Each communications station includes at least one optical transmitter, consisting of the electronic and electro-optic equipment (e.g. a laser) necessary to convert an information signal, either analog or digital, to an optical signal suitable for transmission through the network. Each station also includes at least one receiver consisting of the electronic and electro-optic equipment (e.g. a photodiode) necessary to convert an incoming optical signal to electronic form, and extracting the information content from the signal. Preferably, transmitters and receivers are capable of "tuning" to a reasonably large subset of all wavebands and channels—all of them, ideally. Each station also has the equipment necessary to implement the control and signaling operations described below.

Each network node includes a controllable "linear divider-combiner" (LDC) assembly. Its function is to split the optical powers arriving at each inbound communications link in prescribed proportions, and then recombine them in prescribed proportions onto the outbound links. In other words, if, at a node X, there are n optical input links $$x_1', x', ..., x_n'$$

carrying optical powers $$P_1', P_2', ..., P_n',$$

and if there are m optical output links $$x_1, x_2, ..., x_m,$$

then, ideally, the i-th output link $x_i$ carries a linear combination of the input powers, $$P_i = \gamma_{i,1} P_1' + \gamma_{i,2} P_2' + ... + \gamma_{i,n} P_n',$$

the parameters $\gamma_{i,j}$ being controllable between 0 and 1.

Preferably, power dividing and combining is done separately for each waveband, e.g., as described below with reference to FIG. 3 and 4. Through these dividing and combining operations signals associated with man different connections are routed through nodes to their destinations.

Controllability of the power-combining operation is essential, e.g., to allow the full optical-fiber capacity to be shared among many independent channels in a controllable fashion, to allow the many channels sharing the fiber to be directed controllably to their desired destinations. Controllability of power dividing is also essential to allow for selectively multicast connections. Controlling these operations separately for each waveband, i.e., waveband-selective dividing and combining is important for enhanced performance of the network. For example, waveband selective LDC's can confine signals on prescribed wavebands to limited regions of a large network, thereby enabling the reuse of the same portion of the optical spectrum in other parts of the network. Manyfold reuse of the optical spectrum in this manner increases the effective capacity of the network many fold.

Figure 2:
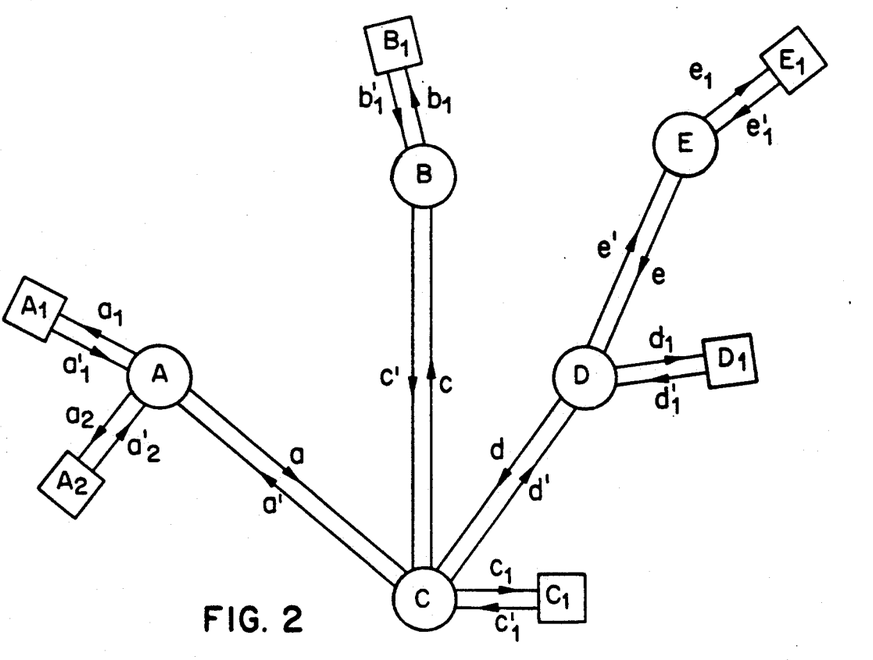
FIG. 2 is a network diagram corresponding to an exemplary signaling subnetwork of the communications network of FIG. 1.

FIG. 2 shows a subnetwork of the network of FIG. 1. This subnetwork serves as a signaling subnetwork (SS)—here a signaling tree (ST)—and includes all the nodes and attached stations of the network of FIG. 1, but only selected communications links forming a tree structure originating at node C. In this embodiment in addition to its communications-routing function, node C is assigned the role of a network control center (NCC). The purpose of the SS is to distribute control and related information throughout the network.

In preferred network operation a desired connection, e.g. from source station $E_1$ to destination station $A_2$ is established upon request of the source station, and then disconnected after the stations indicate that the connection should be terminated. Upon request originating with one of the communications stations, the network control center assigns a suitable end-to-end path or paths, a waveband, and a channel. Multicast connections are also possible (e.g., from Al to the set including $B_1$, $C_1$, and $D_1$.) Furthermore, a single station may be the destination for connections originating at several different sources if each source transmits on a distinct channel and/or waveband, and if the station is equipped to receive several different channels simultaneously.

Operation of the aforementioned type, in which optical connections are maintained until the stations request termination, is referred to as "circuit-switched" operation. The control of these connections may be effected using a signaling subnetwork as described below. Other modes of operation essentially of the "packet-switched" type are also possible. For example, a station wishing to communicate short bursts of information (packets) sequentially to many different destinations may be connected to those stations via a multicast connection, on which each destination station "listens" for the packets addressed to it. (In packet-switched configurations, each packet contains a destination address.) Assuming that the source station is assigned a fixed channel and waveband, all destination stations expecting to receive packets from it must tune to that channel and waveband. Using this technique, a station desiring to receive packets from several sources must be capable of receiving the (distinct) channels assigned to each of the several sources simultaneously, or must be capable of (rapidly) tuning alternately to each of these channels at the expected arrival times of the packets destined for it. (This implies that there is some means of suitably scheduling the transmission times for the various packets traversing the network.) Essentially the same type of packet-switched scheme can be implemented by associating a fixed channel and waveband with each destination station and requiring each transmitter to tune to the particular channel associated with a given destination when transmitting a packet destined for that station.

Control of the network under packet-switched operation can also be effected via the signaling subnetwork, requiring the exchange of packet scheduling information in addition to that required in the circuit-switched mode of operation. A method for packet-scheduling is described by M. Chen et al., "A Media-access Protocol for Packet-switched Wavelength Division Multiaccess Metropolitan Area Networks", IEEE Journal on Selected Areas in Communications, Vol. 8, pp. 1048-1057 (1990). Alternatively, packet operation can be effected in a "random access" mode, wherein no scheduling information is exchanged.

Under th simplifying assumption of three wavebands W1, W2, and W3 (instead of the 16 mentioned above), FIG. 3 shows a preferred embodiment of a waveband-selective LDC assembly, including an optical multiplexer-demultiplexer assembly at communications node A of FIG. 1. Incoming communications links $a_1'$, $a_2'$, $a'$, and b are connected to waveband demultiplexers 31 through 34 which are adapted to feed demultiplexed signals in waveband W1 to ports 101 through 104 of linear divider-combiner LDC1, signals in waveband W2 to ports 201 through 204 of LDC2, and signals in waveband W3 to ports 301 through 304 of LDC3. On the output side of the LDC's, ports 101', 201', and 301, are connected to waveband multiplexer 35 for multiplexing onto output link $a_1$; similarly, the other output ports of the LDC's are connected for multiplexing onto output links $a_2$, a, and b' by respective multiplexers 36 through 38. Further connected, to input and output ports 105 and 105' of LDC1, is a node controller (NC) 39 which includes a processing unit (e.g., a microprocessor with associated memory), a means for issuing control signals to the LDC's, and an optical transmitter and receiver to allow it to communicate with the stations attached to its node, as well as with node controllers at the other nodes.

Figure 3:
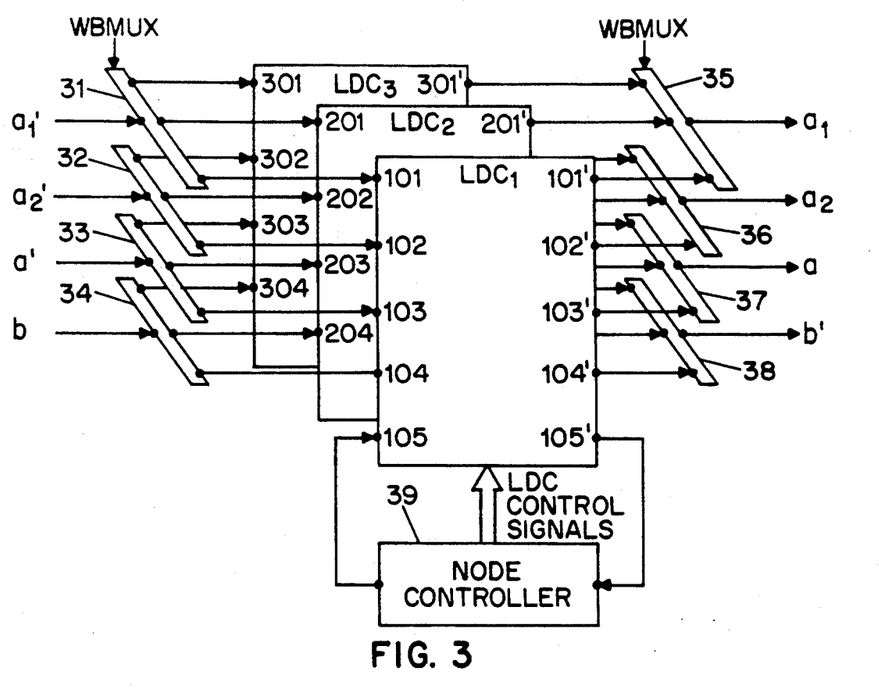
FIG. 3 is a schematic representation of a preferred waveband multiplexer-demultiplexer assembly for a node of the communications network of FIG. 1.
Figure 4:
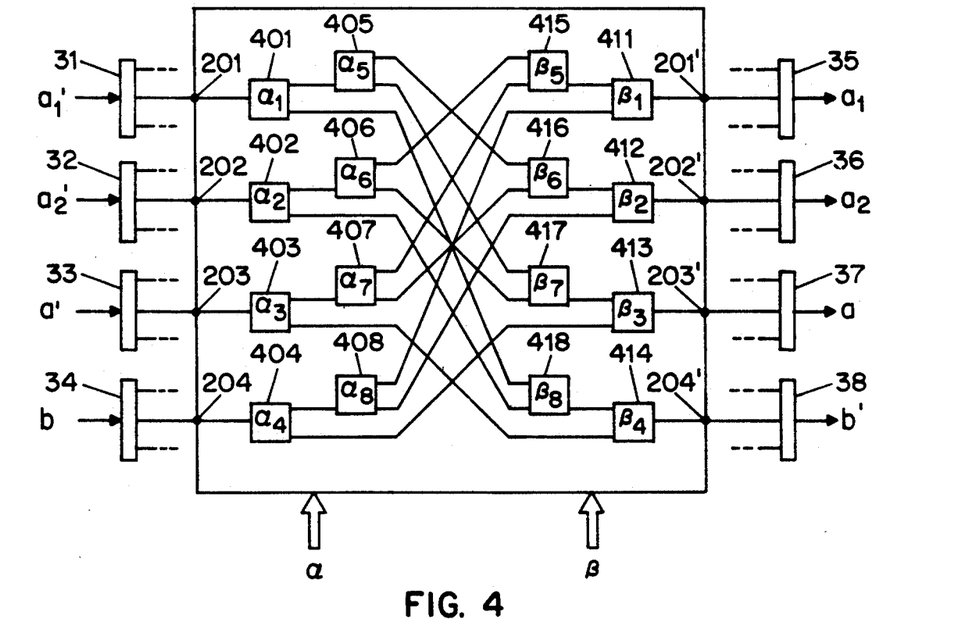
FIG. 4 is a schematic representation of a preferred optical divider-combiner assembly for communications connections at a node of the communications network of FIG. 1.

FIG. 4 shows LDC2 at communications node A, with input ports 201 through 204 and output ports 201' through 204' as in FIG. 3. Included are controllable optical power dividers 401 through 408 and power combiners 411 through 418 which are optically interconnected as shown. An identical assembly may be used as LDC3.

Figure 5:
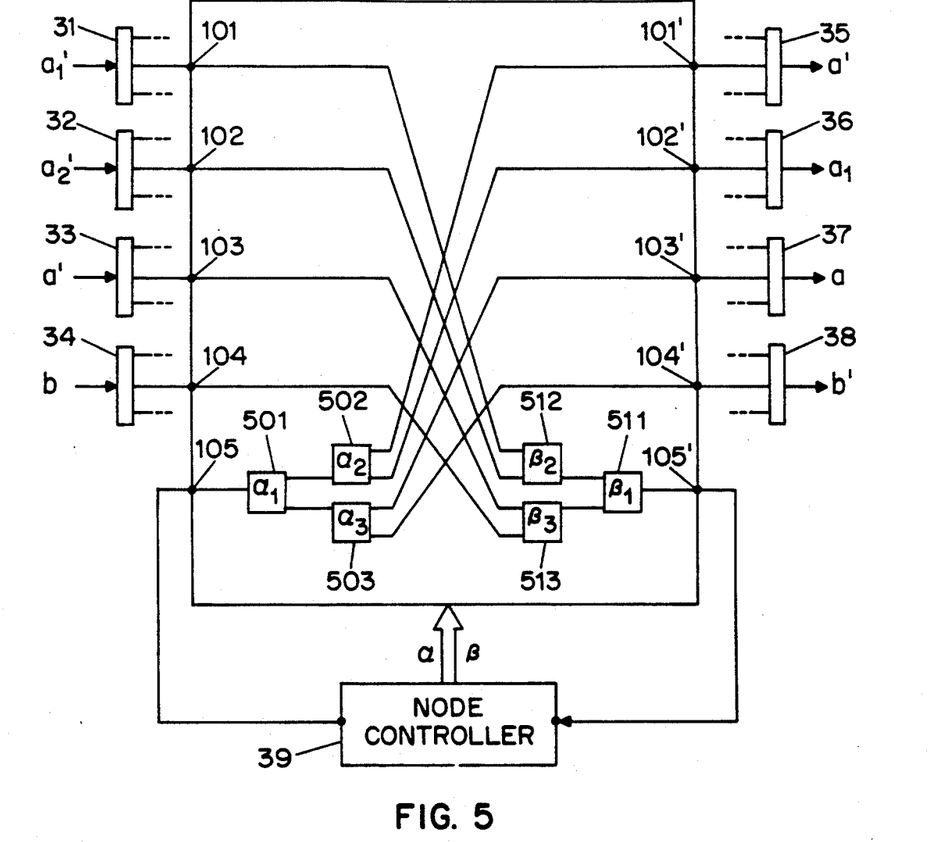
FIG. 5 is a schematic representation of a preferred optical divider-combiner assembly for signaling connections at a node of the signaling network of FIG. 2.

FIG. 5 shows LDC1 at communications node A, with input ports 101 through 104 and output ports 101' through 104' as in FIG. 3. Included are power dividers 501 through 503 and power combiners 511 through 513 which are optically interconnected as shown. Shown further, in correspondence with FIG. 3, is node controller 39.

Figure 6:
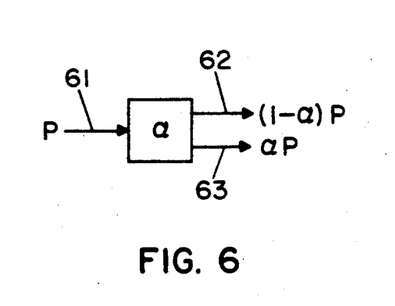
FIG. 6 is a schematic diagram of a preferred optical divider for the assemblies of FIG. 4 and 5.

FIG. 6 shows a controllable optical power divider structure 60 as may be used for dividers 401 through 408 of FIG. 4, and 501 through 503 of FIG. 5. Such a divider device or element has an optical input port 61 and optical output ports 62 and 63, and it is controllable such that, ideally, a portion $(1-\alpha)$ of input power P appears at port 62, and a complementary portion o at port 63. The parameter $\alpha$ is electrically or otherwise controllable, e.g., through an electro-optic or acousto-optic effect, or through mechanical changes in the physical geometry of all-fiber devices. Power dividers of interest here are typically called controllable couplers or filters, and exist based on various materials, including lithium niobate, semiconductors, and silica. In an ideal device, $\alpha$ can be adjusted through a range from 0 to 1; when operated in the 0 or 1 state only, such a device acts as an optical switch. Physically realized devices approach the ideal quite closely.

Figure 7:
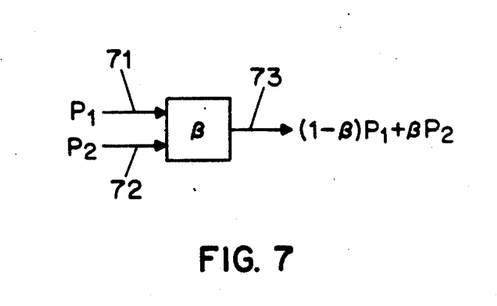
FIG. 7 is a schematic diagram of a preferred optical combiner for the assemblies of FIG. 4 and 5.

FIG. 7 shows a controllable optical combiner 70 as an optical divider of FIG. 6 operating in the reverse direction. Powers P1 and P2 at respective input ports 71 and 72 are linearly combined into an output power $(1-\beta)P1 + \beta \cdot P2$ at output port 73. Devices of the type shown in FIGS. 6 and 7 are typically known as controllable directional couplers. They typically have two input and two output ports. Here, in FIG. 6, only one of the input ports is used, and only one of the output ports in FIG. 7.

By adjusting the dividing and combining parameters in FIG. 4, a wide range of desired linear combinations of input powers can be delivered to the various output ports. In the present embodiment, "loop-back" connections, e.g. b to b' are omitted as they are normally not required. These could be included, however, by adding additional dividers and combiners.

In the present embodiment, waveband W1 is used exclusively for purposes of network control. The node controller transmits on W1, and its signals are multiplexed onto the output links by the waveband multiplexers. Similarly, input power on W1 emanating from the various input fibers is separated in the waveband demultiplexers, combined in prescribed proportions through the combiners in LDC1, and delivered to the receiver in the node controllers. The node controller provides the necessary control of the parameters $\alpha$ and $\beta$, for LDC1, LDC2, and LDC3. In this embodiment, the structure of LDC1 is simpler than that of LDC2 and LDC3, allowing optical connectivity among adjacent node controllers and their attached stations only. Alternative embodiments of LDC1, similar in form to LDC2 and LDC3 would permit more general connectivity.

Figure 8:
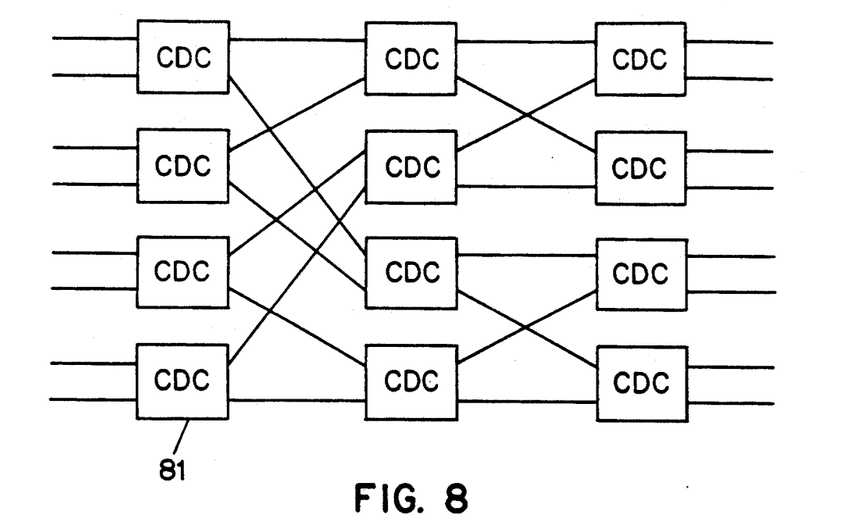
FIG. 8 and 9 are a schematic diagrams of preferred alternative optical divider-combiner assemblies.
Figure 9:
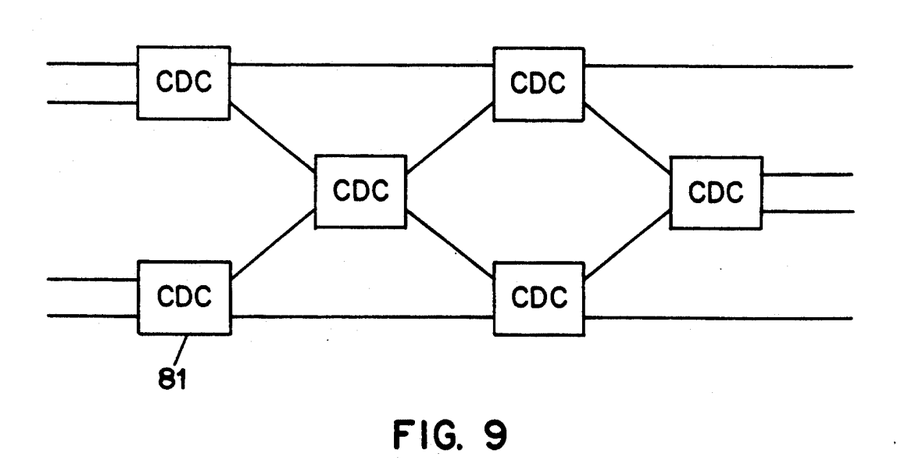

As described, in a controllable linear divider-combiner structure, dividers as well as combiners may be controllable. Alternatively, such a structure may include controllable dividers and fixed combiners, fixed dividers and controllable combiners, or any other suitable combination of controllable and fixed divider/combiner elements. Also, a wide variety of configurations other than that shown in FIG. 4 can achieve controllable linear dividing and combining. Two such further examples are shown in FIG. 8 and 9, respectively known as $(8 \times 8)$ Banyan and $(4 \times 4)$ Benes structures, both involving the use of arrays of interconnected controllable directional couplers (CDC) or filters 81. As compared with corresponding structures built as in FIG. 4, these arrangements require fewer couplers (with less power dissipation); however, they may not realize a full range of input-output connections. Linear divider-combiner structures may also incorporate optical amplification in the form of semiconductor or fiber amplifiers so as to compensate for losses in the LDC and for attenuation in the connected fibers.

Each of the nodes in the network of FIG. 1 is constructed similarly to node A. Clearly, a node could be designed to handle a different number of input/output ports and a different number of wavebands. Furthermore, waveband selectivity may be built into a node without waveband multiplexers and demultiplexers, by using only one component LDC in which each divider and combiner has a parameter $\alpha$ or $\beta$ which is waveband-selective, and independently controllable for each waveband. One such suitable structure is disclosed in U.S. Pat. No. 4,906,064, issued Mar. 6, 1990 to K. Cheung, involving controllable switching elements including mode conversion means. Finally, it is possible to construct integrated dividers and combiners which may be used instead of the discrete units described above.

Routing

In preferred network operations, in response to a connection request, a feasible path through the network is determined, a waveband and channel assigned, and the LDC-parameters in the nodes along the chosen route are adjusted accordingly. For example, if a connection from $A_2$ to $E_1$ is to be routed via node B (i.e., using the shortest path), and using Channel 1 in waveband W2, the parameters in LDC2 in node A may be adjusted as follows: $\alpha_2 = \beta_8 = 1$, $\beta_4 = 0$. Reference to FIG. 4 shows that this establishes a straight-through path form fiber $a_2'$ to $b'$. Similar adjustments at nodes B and E complete the end-to-end connection, directing all power from the transmitter in $A_2$ to the receiver in $E_1$.

Further to the example, a multicast connection $A_1$ to $B_1$, $C_1$, and $D_1$ may be added by routing via the shortest-path tree including links $b'$, a, and $d'$, on waveband W2, using Channel 2. In this case, the parameters in LDC2 in node A are adjusted as follows: $\alpha_1 = \frac{1}{2}$, $\alpha_2 = \alpha_5 = 1$, $\beta_3 = \beta_4 = \beta_7 = 0$, $\beta_8 = \frac{1}{2}$. By reference to FIG. 4 it is verified that these settings combine $\frac{1}{4}$ of the power from $A_1$ and $\frac{1}{2}$ of the power from $A_2$ onto fiber $b'$. This is subsequently split equally at node B, to deliver $\frac{1}{8}$ of the power from $A_1$ and $\frac{1}{4}$ of the power from $A_2$ to each of stations $B_1$ and $E_1$. Since $A_1$ and $A_2$ are assigned different channels, the receivers at $B_1$ and $E_1$ can pick up the desired signals and reject the undesired ones by tuning to their assigned channels. Finally, it is seen that $\frac{1}{4}$ of the power from $A_1$ is directed on fiber a to node C, where it is split equally to deliver $\frac{1}{8}$ of the power from $A_1$ to each of the stations $C_1$ and $D_1$, thus completing the multicast connection. (These relationships can be expressed readily in terms of parameters $\gamma_{i,j}$ as introduced above. For example, for node A, with $m = n = 2$, and with the correspondences $x_1' = a_1'$, $x_2' = a_2'$, $x_1 = b'$, $x_2 = a$: $\gamma_{1,1} = \frac{1}{4}$, $\gamma_{1,2} = \gamma_{2,1} = \frac{1}{2}$, $\gamma_{2,2} = 0$.)

The above routing, waveband/channel assignment, and LDC parameter selections were chosen for the sake of illustration, and many alternatives are possible. For example, if the multicast connection were routed via the tree, a, c, $d'$, it would be possible to assign the same channel in the same waveband to all connections—as no two connections would share the same fiber, in which case the two transmissions from A1 and A2 would not interfere with each other even though assigned to the same channel.

Network Control

As described, a circuit-switched connection may be established by the following steps:

(1) transmission of the connection request to the network control center, (2) verification that the requested destination station or stations are active and ready to receive, (3) determination of a feasible path or paths (including LDC parameter settings), and waveband/channel assignment, (4) transmission of this information to the stations and network nodes involved in the connection, and (5) transmitter and receiver tuning, and LDC parameter adjustment. This can be accomplished with a centralized control structure with a single network control center, e.g., at node C as described above. Distributed control is also possible.

Under packet-switched operation these steps are also required, together with additional control functions associated with packet scheduling and, possibly, with transmitter or receiver tuning.

Assuming that the necessary control program is resident in each network node, any one of the node controllers can be designated as network control center. This has the advantage of allowing for another node to take over the function of network control center in case of failure of the current NCC. Steps (1), (2), and (4) above require transmission of signaling information through the network. This involves the use of a signaling subnetwork (SS), as shown in FIG. 2 for example, which supports control message exchanges between the NCC and the other units in the network.

With reference to a signaling subnetwork, a connection may be established as follows:

(1) A source station initiating a connection request sends a message to the NCC via the SS, specifying the desired destination station or stations, and possibly additional information, e.g., the bitrate and the transmission capabilities of the source.

(2) The NCC sends a message to each requested destination to verify whether it is active and capable of receiving the connection on an available waveband and channel. Each requested active destination replies positively or negatively.

(3) Based on the response in step (2), and on its knowledge of the connections in progress on the network, the NCC determines a feasible path, the necessary LDC settings along the path, and a waveband/channel assignment consistent with the tuning capabilities of the stations involved in the connection. If no feasible path or waveband/channel assignment is available the connection is refused.

(4) If the connection is refused, a refusal message is sent on the SS to the stations involved. Otherwise, a connection establishment message is sent on the SS to all nodes and stations involved in the connection, indicating the required LDC parameters and the waveband/ channel assignment.

(5) The source and destination stations tune to the assigned waveband/channel, the nodes adjust their LDC parameters, and transmission begins.

Termination of a connection may be executed by an analogous exchange of messages. Depending on the protocol chosen, termination may be initiated by the source or by a destination station. Connection refusal or "blocking" will occur with low probability in a network with adequate traffic-handling capacity. As in typical circuit-switched networks (the telephone network, for example), when a connection is blocked, a source attempting a connection will try again later. While the above description has focused on simplex (i.e., one-way transmission), most connections would typically be established as duplex (i.e., two-way) transmission—i.e., each station would act as both a source and a destination.

Signaling Subnetwork

A signaling subnetwork can be realized in various ways. In an embodiment described above, a waveband, W1 is reserved for signaling, and the SS takes the form of a signaling tree (ST), providing signaling paths to and from all stations and nodes. For the sake of simplicity it may be assumed that the SS operates under a random-access protocol, with each station and node including a transmitter and a receiver dedicated to signaling, and tuned to a common channel in W1. Furthermore, it may be assumed that the LDC in each node is configured so that each NC receives signals from all nodes and stations that are adjacent on the ST, and broadcasts to the same set of nodes and stations. For this example the parameters of LDC1 in node A (FIG. 5) are set as follows: $\alpha_1 = \frac{1}{3}$, $\alpha_2 = \frac{1}{3}$, $\alpha_3 = 0$; $\beta_1 = \frac{1}{3}$, $\beta_2 = \frac{1}{3}$, $\beta_3 = 0$. This splits the power from the transmitter in the NC at node A equally among stations $A_1$, $A_2$, and node C, and allows the receiver in the NC at node A to listen to a superposition of transmissions from the same locations. Similar arrangements exist at the other nodes. In the embodiment described here, transmissions over the SS are of two types, signaling messages (SM) and acknowledgments (ACK) Signaling messages associated with steps (1), (2) and (4) above are initiated either by a station or by the NC designated as the NCC. They are transmitted in the form of data packets containing the usual source/destination addressing, control and error detection information. Each NC receiving an SM either transmits an ACK if the SM is addressed to it, retransmits the SM if it is on the path of the signaling tree toward the indicated destination, or else does nothing. For example, referring to FIG. 2, the NC at node D will retransmit an SM coming from the NCC at node C, and addressed to station $E_1$, will transmit an ACK for an SM addressed to itself, and will do nothing on receipt of an SM from the NCC addressed to node B. Because all transmissions are broadcast to all nodes that are adjacent on the ST, a retransmitted SM also arrives at the station that previously transmitted it, thereby serving as an acknowledgment that it was received and forwarded properly. Through successive retransmissions in this fashion, all SM's eventually reach their destinations, provided that there are no messages lost in transmission. There is a possibility that messages will be lost through collisions, a characteristic of all Random-Access protocols, as well as through bit errors. (Collisions occur when messages from two or more transmitters arrive simultaneously at the same receiver. For example, messages from NC's at nodes B and D might simultaneously be received at node C.) The absence of a acknowledgment within a specified "timeout" signifies a collision, in which case the originating station waits a random time interval and then retransmits its message. (This requires storage of each SM until it is acknowledged.) Because of the large bandwidth available on the SS, and the relatively low signaling traffic, the probability of lost messages is normally very low.

The procedure described above provides for reliable transport of all signaling messages required for network control with time delays of the order of the end-to-end network propagation time (typically tens of milliseconds.) Other embodiments of the SS, e.g. TDMA and polling are also possible.

In addition to linear functions implemented as described, nonlinear functions, e.g., signal regeneration, change of wavelength ("wavelength conversion"), and signal storage may be implemented by electronic, opto-electronic, or optical add-ons or overlays. (In the case of electronic and opto-electronic overlays, this involves conversion of optical signals to electrical signals and vice-versa, and electronic or opto-electronic signal processing at some or all nodes of a network.) For example, electronic signal regeneration may become desirable after a signal has been optically transmitted over a long fiber span (possibly including optical amplification) in order to remove accumulated noise and distortion. Wavelength conversion may be desirable in the interest of further flexibility in message routing, or of accommodating transmitters and receivers capable of operating at a limited selection of wavelengths. Signal storage may be desirable in the interest, e.g., of queuing in packet-switched operation. See the above-referenced U.S. Pat. No. 4,914,648 for electronic switching in a suitable, so-called multi-hop network architecture. All of these aspects may arise at a point where two optical networks are linked—at an international gateway, for example.

Nonlinear processing is of interest further for consolidating a plurality of relatively slow signals for transmission, transmitting them as a fast stream of interleaved portions via an optical link serving as a multiplexed "trunk", and then separating the portions towards their destinations. Among further functions conveniently performed electronically are fault detection, scheduling, and frequency control. More specifically, for fault detection, microprocessors at network nodes may generate test messages for transmission over the network and acknowledgment by receiving nodes. Scheduling may be required when operating in a packet-switched mode. Frequency control may take the form of providing a reference signal (nominally at a wavelength of 1550 nanometers, for example) to transmitters and receivers in the network, thereby conveniently allowing wavebands and channels to be defined relative to the reference frequency.

Preferred embodiments of the invention may be included, e.g., in data communications systems, in distributed data base systems in television signal distribution systems, in networks of private branch exchanges, and in networks providing any combination of these services. Messages carried may represent, e.g., voice, data, graphics, video signals, or any combination thereof.

I claim:

1. An optical communications system comprising a first plurality of optical communications links, a second plurality of optical communications noes, and a third plurality of optical communications stations,
    each of the plurality of optical communications stations comprising at least one optical receiver and at least one optical transmitter, and being connected to one of the plurality of optical communications nodes by means of one of the plurality of optical communications links,
    each of the plurality of optical communications nodes being connected to at least one other of the plurality of optical communications nodes by means of one of the plurality of optical communications links, and comprising controllable optical-power divider-combiner means comprising optical input ports and optical output ports to which optical communications links are connected, said controllable optical-power divider-combiner means being adapted to distribute optical signals arriving at said input ports to said output ports such that optical power is essentially linearly divided and combined from said input ports to said output ports in accordance with a prescribed linear combination rule, and said system comprising control means for setting said linear combination to establish desired optical communications paths between communications stations.

2. The system of claim 1, said communication nodes including at least one controllable waveband-selective device operatively coupled between an input port and an output port of said controllable optical-power divider-combiner means for enabling said controllable optical-power divider-combiner means to operate on different wavebands independently of each other.

3. The system of claim 1, said control means comprising signaling means operatively coupled to said optical communications nodes for establishing optical connection paths, divider-combiner settings, channels, and wavebands so as to connect communications stations via optical channels on demand.

4. The system of claim 1, wherein each of the plurality of optical communications links comprises at least one optical fiber.

5. The system of claim 1, said controllable optical-power divider-combiner means comprising at least one controllable acousto-optical device operatively coupled between an input port and an output port of said controllable optical-power divider-combiner means.

6. The system of claim 1, said controllable optical-power divider-combiner means comprising at least one controllable electro-optical device operatively coupled between an input port and an output port of said controllable optical-power divider-combiner means.

7. The system of claim 1, said controllable optical-power divider-combiner means comprising at least one controllable mechanical device for changing the geometry of an optical transmission medium operatively coupled between an input port and an output port of said controllable optical-power divider-combiner means.

8. The system of claim 1, at least one of said plurality of optical communications nodes further comprising nonlinear processing means for performing a nonlinear function on at least selected ones of optical signals received by said at least one of said plurality of optical communications nodes.

9. The system of claim 8, said nonlinear processing means comprising an electronic device for performing said nonlinear function.

10. The system of claim 8, said nonlinear processing means comprising an opto-electronic device for performing said nonlinear function.

11. The system of claim 8, said nonlinear processing means comprising an optical device for performing said nonlinear function.

12. An optical communications method for communicating between first and second ones of a plurality of optical communications stations which are optically connected to an optical communications network comprising a first plurality of optical communications links and a second plurality of optical communications nodes each of which includes controllable optical-power divider-combiner means comprising optical input ports and optical output ports to which optical communications links are connected, said controllable optical-power divider-combiner means being adapted to distribute optical signals arriving at said input ports to said output ports such that optical power is essentially linearly divided and combined from said input ports to said output ports in accordance with a prescribed linear combination rule, comprising the steps of selecting, in response to a connection request, at least one of said plurality of nodes for routing optical signals in said network from the first one to the second one of said plurality of optical communications stations, and setting said controllable optical-power divider-combiner means in said selected at least one of said plurality of nodes, so as to set at least one linear combination by which optical signals are divided and combined.

13. The method of claim 12, comprising operating an optical transmitter in at least one of said plurality of optical communications stations to produce optical signals representative of voice, data graphics, and video signals, and operating a receiver in at least one other of said plurality of optical communications stations to receive at least a portion of the power of said optical signals.

14. The method of claim 12, comprising operating an optical transmitter in at least one of said plurality of optical communications stations to produce optical signals representative of a subset of the set consisting of voice, data, graphics, and video.

15. The method of claim 12, wherein said linear combination is set acousto-optically.

16. The method of claim 12, wherein said linear combination is set electro-optically.

17. The method of claim 12, wherein said linear combination is set mechanically.

18. The method of claim 12, comprising establishing communications routes between communications stations, selected for optimized reliability and load balancing.

19. The method of claim 12, comprising establishing a point-to-point connection between two of said plurality of communications stations.

20. The method of claim 12, comprising establishing a multicast connection between at least three of said plurality of communications stations.

21. The method of claim 12, comprising scheduling of packet transmission between communications stations.

22. The method of claim 12, comprising transmission under random-access packet transmission rules.

23. The method of claim 12, further comprising operating nonlinear signal transfer means for signal regeneration in at least one of said plurality of optical communications nodes.

24. The method of claim 12, further comprising operating nonlinear signal transfer means for effecting a change in carrier-signal waveband in at least one of said plurality of optical communications nodes.

25. The method of claim 12, further comprising operating nonlinear signal transfer means for signal storage in at least one of said plurality of optical communications nodes.

26. The method of claim 12, further comprising operating nonlinear signal transfer means for fault detection in at least one of said plurality of optical communications nodes.

27. The method of claim 12, further comprising operating nonlinear signal transfer means for scheduling of message packets in at least one of said plurality of optical communications nodes.

28. The method of claim 12, further comprising operating a nonlinear element for communications-carrier-frequency control.

* * * * *

UNITED STATES PATENT AND TRADEMARK OFFICE
CERTIFICATE OF CORRECTION

PATENT NO. : 5,191,626
DATED : March 2, 1993
INVENTOR(S) : Thomas E. Stern

It is certified that error appears in the above-identified patent and that said Letters Patent is hereby corrected as shown below:

Col. 1, line 29, "a printer," should read -- a printer, a tape drive, and a console; --; line 47, "8,845,702" should read -- 4,845,702 --. Col. 2, line 15, "Fig. i" should read -- FIG. 1 --. Col. 3, line 57, "$x_1'$, $x'$, ... $x_n'$" should read -- $x_1'$, $x_2'$, ..., $x_n'$ --. Col. 4, line 10, "man" should read -- many --; line 48, "A1" should read -- $A_1$ --. Col. 5, line 28, "th" should read -- the --; line 40, "301" should read -- 301' --. Col. 6, line 5, "portion o" should read -- portion $\alpha$ --. Col. 7, line 54, "$\gamma_{ij}$" should read -- $\gamma_{i,j}$ --. Col. 10, line 50, "systems" should read -- systems, --.

Signed and Sealed this

First Day of March, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,191,626
DATED : March 2, 1993
INVENTOR(S) : Thomas E. Stern

It is certified that error appears in the above-indentified patent and that said Letters Patent is hereby corrected as shown below:

Col. 1, before line 5, insert -- The United States Government has certain rights in this invention pursuant to award EEC-88-11111 by the National Science Foundation.--

Col. 1, line 29, "a printer," should read -- a printer, a tape drive, and a console; --; line 47, "8,845,702" should read -- 4,845,702 --. Col. 2, line 15, "Fig. i" should read -- FIG. 1 --. Col. 3, line 57, "$x_1'$, $x'$, ... $x_n'$" should read --$x_1'$, $x_2'$, ..., $x_n'$ --. Col. 4, line 10, "man" should read -- many --; line 48 "A1" should read -- $A_1$ --. Col. 5, line 28, "th" should read -- the --; line 40, "301" should read -- 301' --. Col. 6, line 5, "portion o" should read -- portion $\alpha$ --. Col. 7, line 54, "$\gamma_{ij}$" should read -- $\gamma_{i,j}$ --. Col. 10, line 50, "systems" should read --systems, --.

Signed and Sealed this

Thirteenth Day of December, 1994

Attest:

BRUCE LEHMAN

Attesting Officer

Commissioner of Patents and Trademarks